United States Patent
Tsutsui

(10) Patent No.: US 7,660,858 B2
(45) Date of Patent: Feb. 9, 2010

(54) MAIL DISTRIBUTING APPARATUS, PROGRAM AND MAIL TRANSMITTING METHOD CAPABLE OF SHORTENING AVERAGE WAIT TIME FOR COMPLETING TRANSMISSION OF MAILS

(75) Inventor: Yuichiro Tsutsui, Tokyo (JP)

(73) Assignee: Techfirm Inc., Tokyo (JP)

( * ) Notice: Subject to any disclaimer, the term of this patent is extended or adjusted under 35 U.S.C. 154(b) by 751 days.

(21) Appl. No.: 11/140,409

(22) Filed: May 26, 2005

(65) Prior Publication Data

US 2006/0010216 A1    Jan. 12, 2006

(30) Foreign Application Priority Data

May 26, 2004  (JP) .............................. 2004-155601

(51) Int. Cl.
*G06F 15/16* (2006.01)
(52) U.S. Cl. ...................................... 709/206; 709/207
(58) Field of Classification Search ................. 709/206
See application file for complete search history.

(56) References Cited

U.S. PATENT DOCUMENTS

| | | | | |
|---|---|---|---|---|
| 5,481,698 A | * | 1/1996 | Itoh et al. | 714/48 |
| 5,555,346 A | * | 9/1996 | Gross et al. | 706/45 |
| 5,646,982 A | * | 7/1997 | Hogan et al. | 379/88.22 |
| 5,896,448 A | * | 4/1999 | Holt | 379/221.03 |
| 6,449,358 B1 | * | 9/2002 | Anisimov et al. | 379/266.07 |
| 6,603,738 B1 | * | 8/2003 | Kari et al. | 370/230.1 |
| 6,754,501 B1 | * | 6/2004 | McRae et al. | 455/453 |
| 6,820,113 B2 | * | 11/2004 | Wang et al. | 709/206 |
| 6,854,007 B1 | * | 2/2005 | Hammond | 709/206 |
| 6,874,130 B1 | * | 3/2005 | Baweja et al. | 715/805 |
| 6,898,190 B2 | * | 5/2005 | Shtivelman et al. | 370/270 |
| 6,996,064 B2 | * | 2/2006 | Klassen et al. | 370/238 |
| 7,149,537 B1 | * | 12/2006 | Kupsh et al. | 455/466 |
| 7,313,385 B2 | * | 12/2007 | Yabe et al. | 715/752 |

(Continued)

FOREIGN PATENT DOCUMENTS

JP    2000-330884 A    * 11/2000

(Continued)

OTHER PUBLICATIONS

Nick Christenson, "sendmail Performance Tuning", Pearson Education, Inc. (2003).*

(Continued)

*Primary Examiner*—Saleh Najjar
*Assistant Examiner*—Robert Shaw
(74) *Attorney, Agent, or Firm*—Nutter McClennen & Fish LLP; John J. Penny, Jr.

(57) ABSTRACT

There is provided a mail distributing apparatus, a program and a mail transmitting method capable of shortening an average wait time for completing transmission of mails. The mail distributing apparatus has a transmission recording section for recording the date and time when a mail has been successfully transmitted last per mailing address, an address selecting section for selecting the addresses to which the mails have been successfully transmitted last on the date and time within a predetermined period by making reference to the transmission recording section when it is commanded to distribute mails to a plurality of addresses and a transmitting section for transmitting the mails to the addresses selected by the address selecting section at first and then transmitting the mails to the other addresses.

16 Claims, 5 Drawing Sheets

U.S. PATENT DOCUMENTS

| | | | | |
|---|---|---|---|---|
| 2002/0120705 | A1* | 8/2002 | Schiavone et al. | 709/207 |
| 2002/0160757 | A1* | 10/2002 | Shavit et al. | 455/414 |
| 2002/0193135 | A1* | 12/2002 | Nakano | 455/524 |
| 2004/0003042 | A1* | 1/2004 | Horvitz et al. | 709/204 |
| 2004/0111523 | A1* | 6/2004 | Hall et al. | 709/230 |
| 2004/0120256 | A1* | 6/2004 | Park | 370/235 |
| 2004/0205377 | A1* | 10/2004 | Nakamura et al. | 714/4 |
| 2004/0243679 | A1* | 12/2004 | Tyler | 709/206 |
| 2005/0033812 | A1* | 2/2005 | McCarthy et al. | 709/206 |
| 2005/0033855 | A1* | 2/2005 | Moradi et al. | 709/231 |
| 2005/0086335 | A1* | 4/2005 | Liu et al. | 709/223 |
| 2005/0091323 | A1* | 4/2005 | Smith et al. | 709/206 |
| 2005/0108384 | A1* | 5/2005 | Lambert et al. | 709/224 |
| 2005/0108402 | A1* | 5/2005 | Colson et al. | 709/206 |
| 2005/0198155 | A1* | 9/2005 | Zakharoff | 709/206 |
| 2008/0130505 | A1* | 6/2008 | Yoshimura et al. | 370/236 |

OTHER PUBLICATIONS

W. Richard Stevens, TCP/IP Illustrated, vol. 1: The Protocols, Addison Wesley Professional (Dec. 31, 1993), ISBN-10: 0-201-63346-9, ISBN-13: 978-0-201-63346-7.*

Mike Loukides; Tim O'Reilly; Jerry Peek; Shelley Powers, UNIX Power Tools, 3rd Edition, O'Reilly & Associates, Inc. (2003) ISBN: 0-596-00330-7.*

Bryan Costales with Eric Allman, "sendmail, Third Edition", O'Reilly & Associates (2003) ISBN: 1-56592-839-3.*

Sendmail High Volume Mail Solution (HVMS) Data Sheet, Sendmail, Inc., (2002).*

* cited by examiner 10, 50

| ADDRESS | DATE AND TIME WHEN MAIL HAS BEEN SUCCESSFULLY TRANSMITTED LAST | DATE AND TIME WHEN MAIL HAS BEEN TRANSMITTED THIS TIME | DATE AND TIME WHEN FAIL MESSAGE HAS BEEN RECEIVED | REPLY TIME |
|---|---|---|---|---|
| ***@△△.com | MARCH 1, 2004 12:00:00.00 | APRIL 1, 2004 12:00:00.00 | — | — |
| ×××@▽△.co.jp | MARCH 1, 2004 12:00:00.05 | APRIL 1, 2004 12:00:00.05 | — | — |
| .... | .... | .... | .... | .... |
| ×〇×@□□.ne.jp | FEB. 1, 2004 12:05:00.00 | APRIL 1, 2004 15:00:00.00 | — | — |
| △△@×〇.com | JAN. 15, 2004 12:25:00.50 | APRIL 1, 2004 15:00:00.10 | APRIL 1, 2004 15:00:30.00 | 29.9 SEC. |
| ▽〇×@**co.jp | DEC. 15, 2003 12:03:00.10 | APRIL 1, 2003 15:00:00.20 | APRIL 1, 2004 15:01:10.00 | 1:09.80 |
| .... | .... | .... | .... | .... |

Rows 1–3: SELECTED ADDRESSES
Rows 4–6: OTHER ADDRESSES

FIG. 3

MAIL DISTRIBUTING APPARATUS, PROGRAM AND MAIL TRANSMITTING METHOD CAPABLE OF SHORTENING AVERAGE WAIT TIME FOR COMPLETING TRANSMISSION OF MAILS

CROSS REFERENCE TO THE RELATED APPLICATION

The present application claims priority from a Japanese Patent Application No. 2004-155601 filed on May 26, 2004, the contents of which are incorporated herein by reference.

BACKGROUND OF THE INVENTION

1. Field of the Invention

The present invention relates to a mail distributing apparatus, a program and a mail transmitting method capable of shortening an average wait time for completing transmission of mails. More specifically, the invention relates to a mail distributing apparatus, a program and a mail transmitting method for transmitting mails to addresses to which mails have been successfully transmitted within a predetermined period and then, transmitting the mails to the other addresses.

2. Description of Related Art

Conventionally, it is often required to transmit mails to a large number of different addresses from a mail distributing apparatus. It is noted that although the present applicant is unaware of technological documents describing such matter, a method of preparing a list of addresses to which mails are to be transmitted in advance and of transmitting mails to the respective addresses in accordance to the list is being taken in distributing mails by means of a mailing list for example.

However, such list often contains unusable or invalid mailing addresses among addresses recorded therein. When the list of mailing addresses contains a large number of such invalid mailing addresses and when mails are transmitted in accordance to the list, the mails are transmitted even to those invalid mailing addresses. As a result, there has been a problem that it takes time for completing the transmission of the mails to valid addresses.

SUMMARY OF INVENTION

In order to solve the problem described above, according to a first aspect of the invention, there is provided a mail distributing apparatus having a transmission recording section for recording the date and time when a mail has been successfully transmitted last per mailing address, an address selecting section for selecting the addresses to which the mails have been successfully transmitted last on the date and time within a predetermined period by making reference to the transmission recording section when it is commanded to distribute mails to a plurality of addresses and a transmitting section for transmitting the mails to the addresses selected by the address selecting section at first and then transmitting the mails to the other addresses. Here, there may be case when the mailing addresses are unusable due to some reasons of its user. However, according to the invention, the mail distributing apparatus transmits the mails to the addresses to which the mails are more likely to be successfully transmitted at first, so that it can shorten an average wait time for completing the transmission of mails to the valid addresses as compared to a case of transmitting the recorded mails without specifically taking account of the order.

The transmitting section may transmit the mails to the other addresses by periods lower than that of the selected addresses. Because many of the other mailing addresses are more likely to be invalid mailing addresses, a large number of fail messages indicating that the mails have not been transmitted to those addresses will be returned to the mail distributing apparatus when the mails are transmitted to those addresses. However, because the inventive mail distributing apparatus transmits the mails to the other addresses by the lower periods, it can avoid from congesting itself due to the fail massages.

The mail distributing apparatus may also have a reply time recording section for recording a time taken to receive the fail message since when the mails have been transmitted when it receives the fail message indicating that the mail has not been transmitted to the address and the transmitting section may transmit the mails so that the number of mails transmitted within a reply time recorded by the reply time recording section becomes equal or less than a number set in advance. It allows the mail distributing apparatus to prevent congestion from occurring even when a large number of fail messages are supposed to be returned by transmitting a large volume of mails.

The mail distributing apparatus may have a fail rate measuring section for measuring a fail rate which is a ratio of a number of received fail messages to the number of mails transmitted to the other addresses and the transmitting section may determine the periods for transmitting mails to the other addresses based on the fail rate and the reply time so that the number of fail messages notified within the reply time recorded in the reply time recording section becomes equal to or less than a value set in advance. That is, the inventive mail distributing apparatus can change the mail transmitting period dynamically corresponding to the number of fail messages, so that it can transmit the mails while avoiding the congestion thereof.

The transmitting section may lower the mail transmitting period when the mail distributing apparatus receives the fail messages at rate higher than the fail rate. It allows the mail distributing apparatus to avoid the congestion even if the fail rate becomes worse.

The transmitting section may also predict the time when the distribution of the mails ends based on the fail rate and may inform a user of the mail distributing apparatus of that. It enables the user of the mail distributing apparatus to know the time when the distribution of mails ends in advance.

Still more, the transmitting section may lower the mail transmitting period on receiving the fail messages. It enables the mail distributing apparatus to avoid the congestion more steadily.

According to a second aspect of the invention, there is provided a program for operating a mail distributing apparatus as transmission recording means for recording the date and time when a mail has been successfully transmitted last per mailing address, address selecting means for selecting the addresses to which the mails have been successfully transmitted last on the date and time within a predetermined period by making reference to the transmission recording means when it is commanded to distribute mails to a plurality of addresses and transmitting means for transmitting the mails to the addresses selected by the address selecting means at first and then transmitting the mails to the other addresses.

The transmission means may transmit the mails to the other addresses by periods lower than that of the selected addresses.

The program may operate the mail distributing apparatus also as a reply time recording means for recording a time taken to receive a fail message since when the mail has been transmitted when the mail distributing apparatus receives the fail message indicating that the mail has not been transmitted to the address and the transmission means may transmit the mails so that a number of mails transmitted within a reply time recorded in the reply time recording means becomes equal to or less than a number set in advance.

The transmission means may determine the period for transmitting mails to the other addresses based on a fail rate and the reply time so that the number of fail messages notified within the reply time recorded in the reply time recording means becomes equal to or less than a value set in advance.

The transmission means may lower the mail transmitting period when the mail distributing apparatus receives the fail messages at rate higher than the fail rate.

The transmission means may predict the time when the distribution of mails ends based on the fail rate and may inform the user of the mail distributing apparatus of that.

According to a third aspect of the invention, there is provided a mail transmission method having a transmission recording step for recording the date and time when a mail has been successfully transmitted last per mailing address, an address selecting step for selecting the addresses to which the mails have been successfully transmitted last on the date and time within a predetermined period by making reference to the transmission recording section when it is commanded to distribute mails to a plurality of addresses and a transmitting step for transmitting the mails to the addresses selected by the address selecting section at first and then transmitting the mails to the other addresses.

In the transmission step, the mails may be transmitted to the other addresses by periods lower than that of the selected addresses.

The mail transmitting method may further include a reply time recording step for recording a time taken to receive a fail message since when the mail has been transmitted when the mail distributing apparatus receives the fail message indicating that the mail has not been transmitted to the address and the mails may be transmitted in the transmitting step so that a number of mails transmitted within a reply time recorded in the reply time recording step becomes equal to or less than a number set in advance.

In the transmission step, the period for transmitting mails to the other addresses may be determined based on the fail rate and the reply time so that the number of fail messages notified within the reply time recorded in the reply time recording step becomes equal to or less than a value set in advance.

In the transmission step, the mail transmitting period may be lowered when the mail distributing apparatus receives the fail messages at rate higher than the fail rate.

In the transmission step, the time when the distribution of the mail ends may be predicted based on the fail rate and that may be informed to the user of the mail distributing apparatus.

It is noted that the summary of the invention does not necessarily describe all necessary features of the invention. The invention may also be a sub-combination of the features described above.

BRIEF DESCRIPTION OF THE DRAWINGS

FIG. 3 is one example of data recorded by a transmission recording section and a reply time recording section.

DETAILED DESCRIPTION OF THE INVENTION

The invention will now be described based on preferred embodiments thereof, which do not intend to limit the scope of the invention, but exemplify the invention. All of the features and the combinations thereof described in the embodiments are not necessarily essential to the invention.

Figure 1:
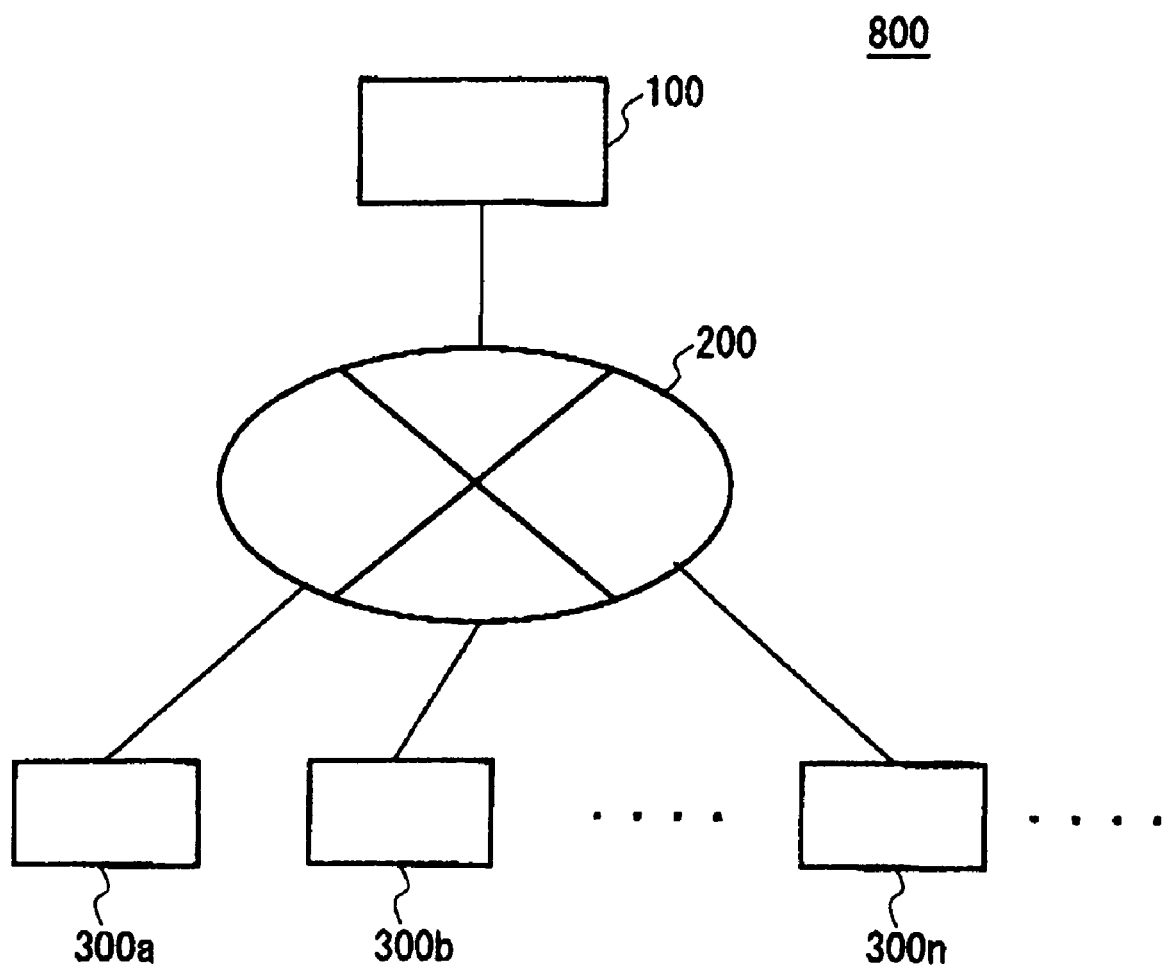
FIG. 1 is a diagram showing one exemplary configuration of a mailing system according an embodiment of the invention.

FIG. 1 is a diagram showing one exemplary configuration of a mailing system 800 according one embodiment of the invention. The mailing system 800 includes a mail distributing apparatus 100, a network 200 and a plurality of servers 300a through 300n. The mail distributing apparatus 100 and the plurality of servers 300a through 300n are connected with the network 200, respectively.

The mail distributing apparatus 100 transmits mails to a plurality of different addresses. The servers 300 in this case are mail servers for administering mails or relay servers for relaying data to other servers for example and receive or relay the mail transmitted by the mail distributing apparatus 100. The server 300 also returns a fail message indicating that the mail has not been correctly distributed to the address to the mail distributing apparatus 100 when the mailing address to which the mail has been transmitted from the mail distributing apparatus 100 is invalid or when the server 300 that should receive the mail is in trouble.

When mails are to be transmitted to a plurality of different addresses from a conventional mail distributing apparatus, a list of addresses to which the mails are to be transmitted is prepared in advance and then the mails are transmitted to the respective addresses in accordance to the list. However, the list in which such addresses are recorded often contains invalid mailing addresses. Then, there has been a problem that it takes time to complete transmission of mails to valid addresses in transmitting the mails in accordance to the address list when the list contains a large number of such invalid addresses. Still more, there has been a problem, when the list contains the large number of invalid mailing addresses and when mails are transmitted to the large number of addresses at once, that a large number of fail messages are returned, thus causing congestion in the mail distributing apparatus. Accordingly, the invention provides the mail distributing apparatus 100 that is capable of solving such problems.

Figure 2:
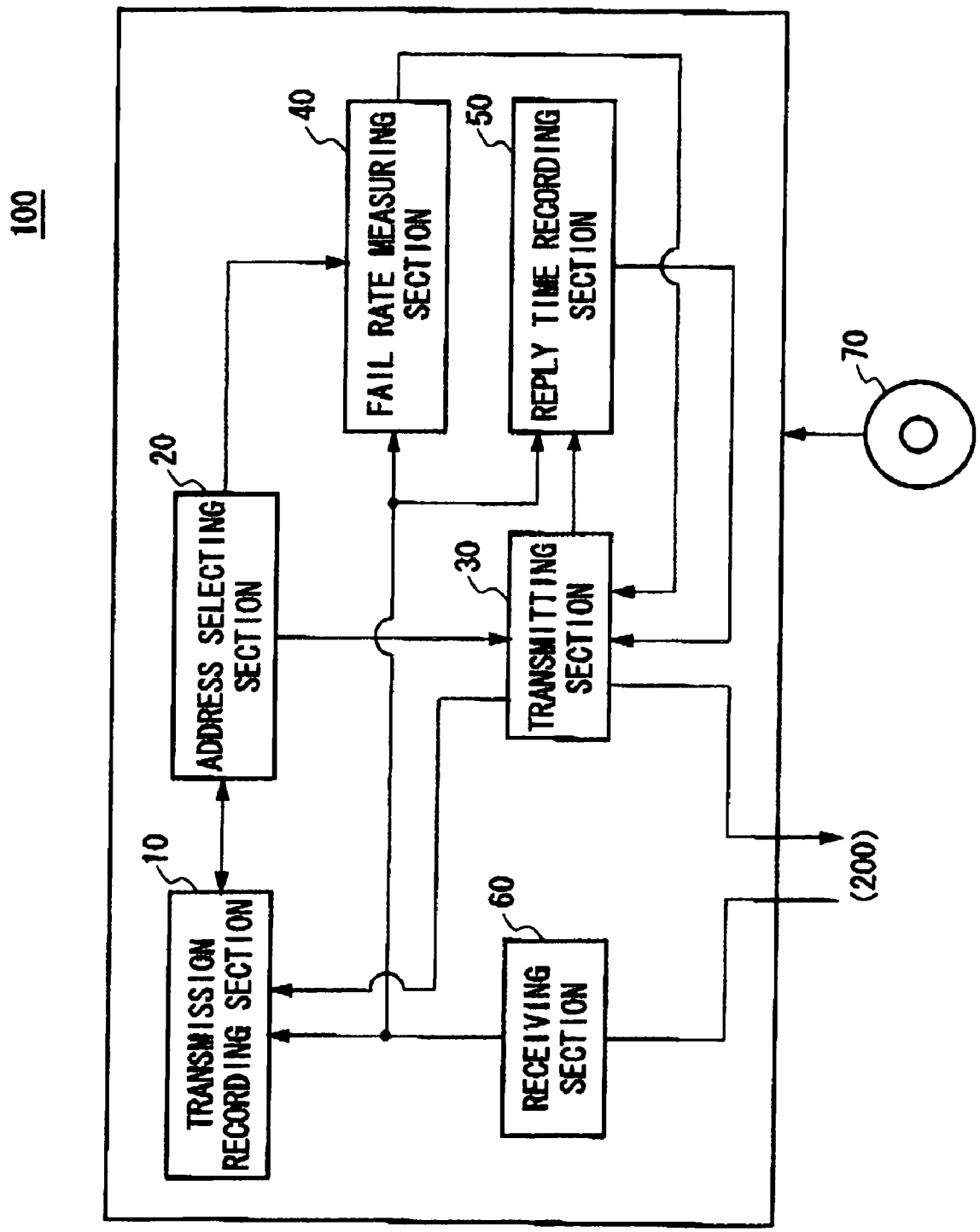
FIG. 2 is a diagram showing one exemplary detailed configuration of a mail distributing apparatus.

FIG. 2 is a diagram showing one exemplary detailed configuration of the mail distributing apparatus 100. The mail distributing apparatus 100 has a transmission recording section 10, an address selecting section 20, a transmitting section 30, a fail rate measuring section 40, a reply time recording section 50, a receiving section 60 and a recording medium 70.

The transmission recording section 10 stores a plurality of mailing addresses in advance and records the date and time when a mail has been successfully transmitted last per mailing address. Then, when the mail distributing apparatus 100 is instructed by its user to distribute mails to the plurality of addresses, the address selecting section 20 selects the addresses to which mails have been successfully transmitted last on the date and time within a predetermined period by making reference to the transmission recording section 10. It is noted that the user of the mail distributing apparatus 100 for example defines the predetermined period.

The transmitting section 30 transmits the mails to the addresses selected by the address selecting section 20 at first and then transmits the mails to the other addresses. Because the inventive mail distributing apparatus 100 transmits the mails to the addresses to which the mails are more likely to be successfully transmitted at first, it can shorten an average wait time that takes to complete the transmission of mails to the valid addresses.

The transmitting section 30 also transmits the mails to the other addresses by periods lower than that of the selected addresses. It is noted that the period for transmitting mails is time intervals at which the mails are transmitted and is determined by the user of the mail distributing apparatus 100 for example in advance. It enables the inventive mail distributing apparatus 100 to avoid the congestion that is otherwise caused by the fail messages.

Here, the transmitting section 30 of the present embodiment transmits the mails to the other addresses per predetermined number of mails. In this case, after transmitting the predetermined number of mails, the transmitting section 30 waits for a predetermined period of time until when fail messages are returned and then transmits another predetermined number of mails again. Repeating this operation, the transmitting section 30 transmits the mails to all the other addresses. Here, the transmission recording section 10 records the date and time when the mails have been transmitted for all the transmitted mails per mailing address.

When the mail is not distributed normally, the receiving section 60 receives the fail messages from the servers 300. In this case, the transmission recording section 10 records the date and time when the receiving section 60 has received the fail messages by correlating with the mailing addresses that have returned the fail messages. It is noted that the mails that have returned no fail message are mails successfully transmitted. The transmission recording section 10 of the present embodiment records the transmission date and time correlated with the mailing addresses from which no fail message has been returned as the date and time of the last mails that have been successfully transmitted among the mail transmission times and dates previously recorded.

When the other addresses include an unexpectedly large number of invalid mailing addresses or when the traffic of the network 200 is congestive, it is preferable to be able to regulate the mail transmitting period to avoid the congestion caused by the fail messages. Accordingly, the inventive mail distributing apparatus 100 aims at regulating the mail transmitting period.

When the receiving section 60 receives the fail message, the reply time recording section 50 records a time taken to receive the fail message since when the mail has been transmitted as a reply time. The reply time recording section 50 of the present embodiment records the reply time by calculating a difference between the time when the transmitting section 30 had transmitted the mail and the time when the receiving section 60 has received the fail message.

The fail rate measuring section 40 measures a fail rate which is the ratio of a number of received fail messages to a number of mails transmitted to the other addresses. Here, the fail rate measuring section 40 calculates the fail rate by dividing the number of fail messages received by the receiving section 60 by the number of mails transmitted to the other addresses. The fail rate measuring section 40 of the present embodiment calculates the fail rate per predetermined number of mails transmitted by the transmitting section 30.

Then, the transmitting section 30 determines the period for transmitting the mails to the other addresses based on the fail rate and the reply time so that the number of fail messages notified within the reply time recorded by the reply time recording section 50 becomes equal to or less than a predetermined value. The transmitting section 30 of the present embodiment calculates an average reply time that is an average value of reply times recorded by the reply time recording section 50 and determines the transmitting period so that the number of fail messages notified within the average reply time becomes equal to or less than the value set in advance. In this case, the transmitting section 30 calculates a sum of the reply times per predetermined number of transmitted mails and calculates the average reply time by dividing the calculated sum by the predetermined number of mails. Then, the transmitting section 30 calculates the mail transmitting period by multiplying the value obtained by dividing the average reply time by the predetermined number of fail messages notified within the average reply time with the fail rate. Thus, the inventive mail distributing apparatus 100 is capable of transmitting the mails while avoiding the congestion thereof by dynamically changing the mail transmitting period corresponding to the number of fail messages.

When the mail distributing apparatus 100 receives the fail messages at rate higher than the fail rate, the transmitting section 30 lowers the mail transmitting period. Because the transmitting section 30 of the present embodiment calculates the mail transmitting period by multiplying the value obtained by dividing the average reply time by the predetermined number of fail messages notified within the average reply time with the fail rate, the higher the fail rate, the lower the mail transmitting period becomes. Accordingly, the inventive mail distributing apparatus 100 can transmit the mails while avoiding the congestion even when the fail rate becomes worse.

Still more, the transmitting section 30 predicts the time when the distribution of the mail ends based on the fail rate and informs of that to the user of the mail distributing apparatus 100. Here, the transmitting section 30 finds the time when the distribution of the mail ends by calculating a time required for distributing the mail by dividing the number of mails to be transmitted by the mail transmitting period calculated by using the fail rate and by adding the calculated time to the time when the distribution of the mail has been started. Thereby, the user of the inventive mail distributing apparatus 100 can find out the time when the distribution of the mail ends in advance.

Because the inventive mail distributing apparatus 100 transmits the mails to the addresses to which the mails are more likely to be successfully transmitted at first as described above, it can shorten the average wait time necessary for completing the transmission of the mails to the valid addresses. Still more, because the transmitting section 30 transmits the mails to the other addresses by the periods lower than that of the selected addresses, it enables the mail distributing apparatus 100 to avoid the congestion which is otherwise caused by the fail messages. Specifically, because the transmitting section 30 determines the mail transmitting period so that the number of fail messages notified within the reply time recorded by the reply time recording section 50 becomes equal to or less than the value set in advance, the mail transmitting period may be dynamically changed corresponding to the number of fail messages. Thus, the mails may be transmitted while avoiding the congestion from occurring in the mail distributing apparatus 100. Still more, because it lowers the mail transmitting period upon receiving the fail messages at rate higher than the fail rate, the mails may be transmitted while avoiding the congestion from occurring in the mail distributing apparatus 100 even when the fail rate becomes worse.

The recording medium 70 stores transmission recording means, address selecting means, transmitting means, fail rate measuring means and reply time recording means as a program installed in and executed by the mail distributing apparatus 100. Then, the respective means stored in the recording medium 70 operate the corresponding members, i.e., the transmission recording section 10, the address selecting section 20, the transmitting section 30, the fail rate measuring section 40 and the reply time recording section 50, respectively. It is noted that because the functions of the respective members operated by the respective means stored in the recording medium 70 are the same with those of the respective members explained in connection with FIG. 2, their explanation will be omitted here. The recording medium 70 may be an optical recording medium such as a DVD and a PD, a magneto-optical recording medium such as an MD, a taped medium, a magnetic recording medium or a semiconductor recording device.

FIG. 3 is one example of data recorded by the transmission recording section 10 and the reply time recording section 50. The transmission recording section 10 records the date and time when a mail has been transmitted and the date and time when a fail message has been received by correlating with a mailing address. Still more, the transmission recording section 10 records the date and time of a mail recorded in correlation with an address from which no fail message has been received as the last date and time when the mail has been successfully transmitted. The reply time recording section 50 records a reply time by correlating with the mailing address from which the fail message has been received. In this case, the reply time recording section 50 records the reply time calculated from the difference between the time when the mail had been transmitted and the time when the fail message has been received.

Figure 4:
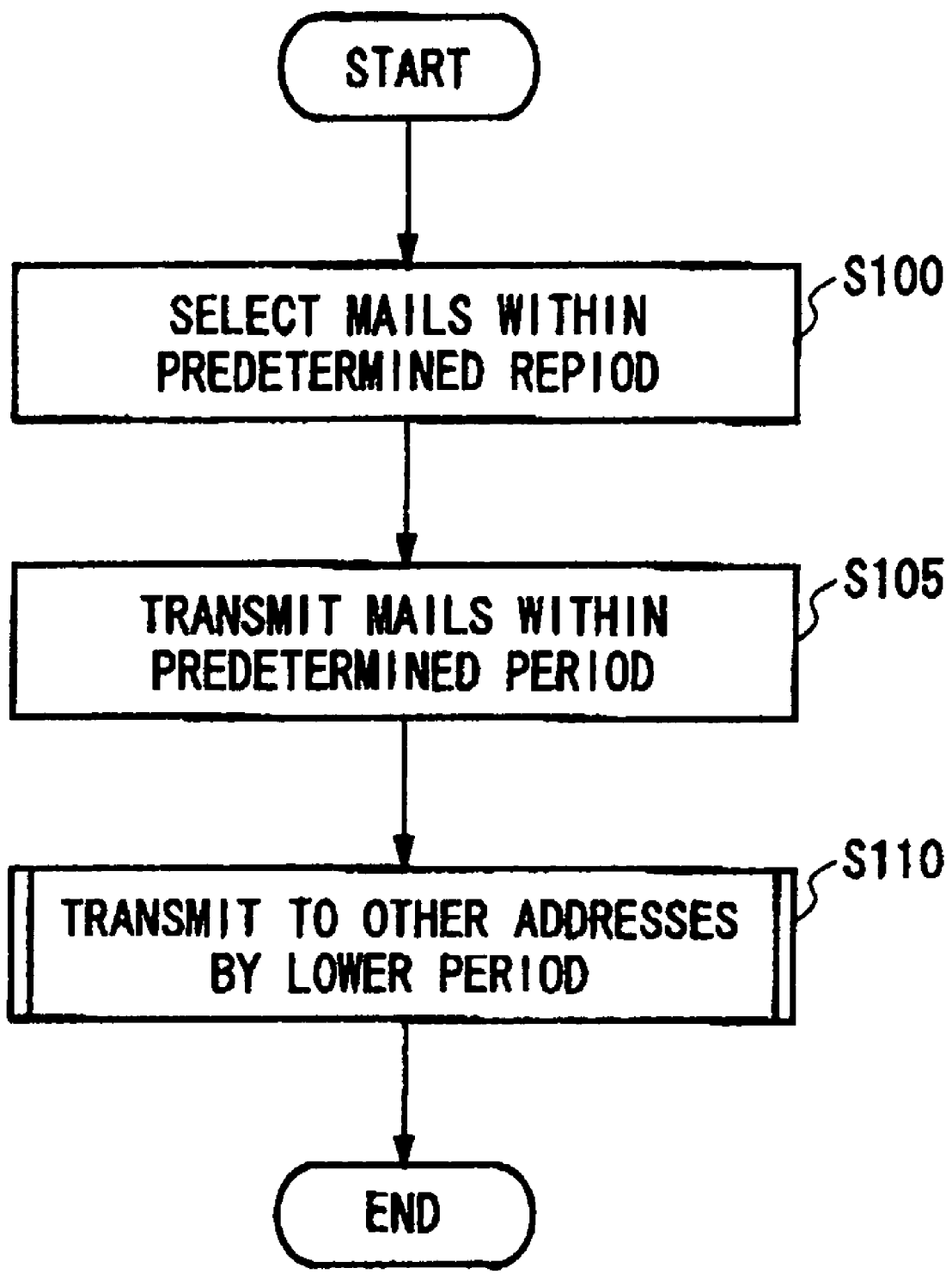
FIG. 4 is a flowchart showing one exemplary operation of the mail distributing apparatus.

FIG. 4 is a flowchart showing one exemplary operation of the mail distributing apparatus 100. By making reference to the transmission recording section 10, the address selecting section 20 selects addresses to which mails have been successfully transmitted last on the date and time within a predetermined period in Step S100. Then, the transmitting section 30 transmits mails to the addresses selected by the address selecting section 20 at first in Step S105. After that, the transmitting section 30 transmits the mails to the other addresses in Step S110. At this time, the transmitting section 40 transmits the mails by the periods lower than that of the selected addresses. It is noted that the transmission recording section 10 records the time when the transmitting section 30 transmits the mails by correlating with the mailing addresses.

Figure 5:
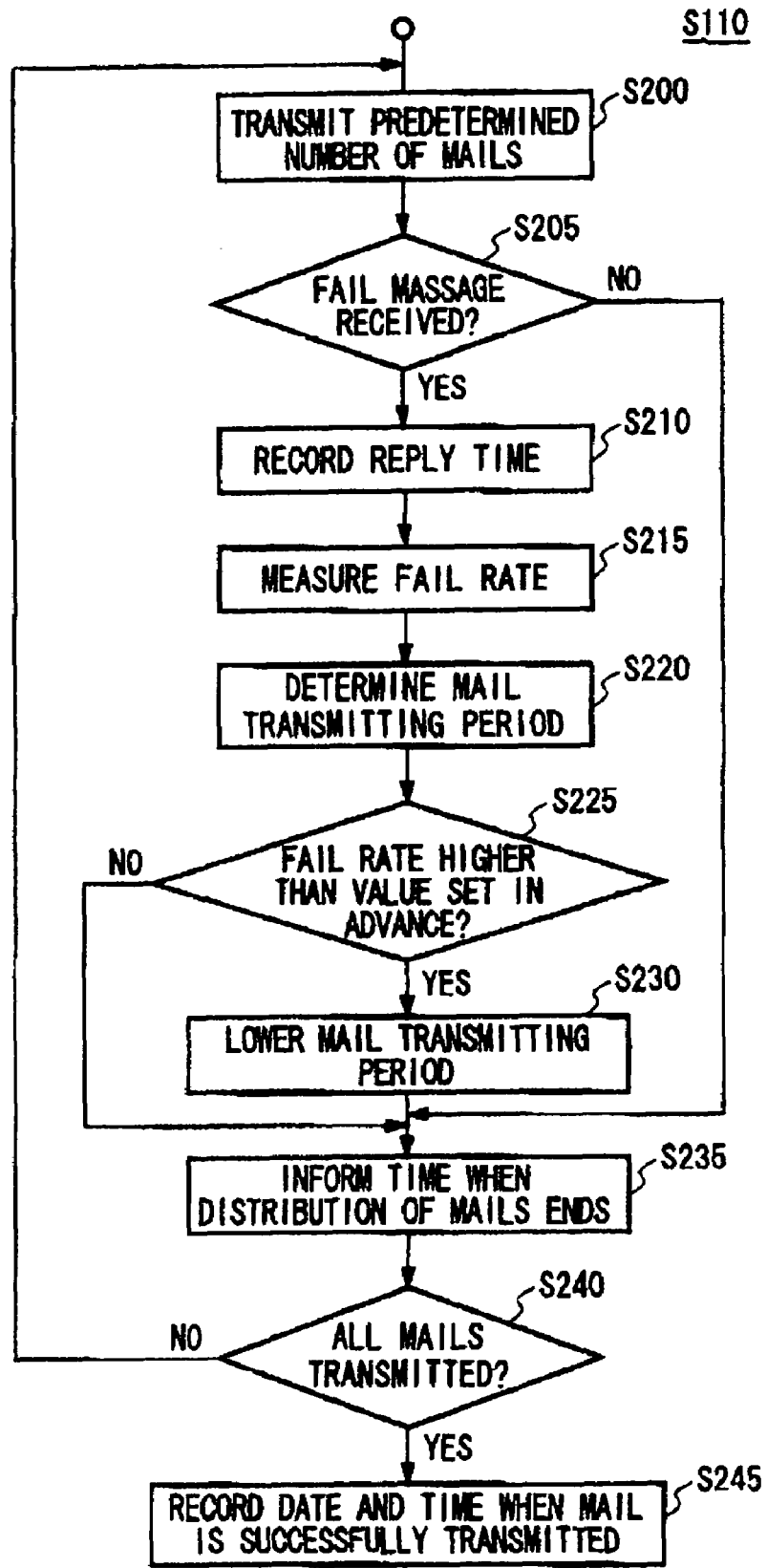
FIG. 5 is a flowchart showing one exemplary detailed operation in Step S110 in FIG. 4.

FIG. 5 is a flowchart showing one example of the detailed operation in Step S110 in FIG. 4. In transmitting the mails to the other addresses, the transmitting section 30 of the present embodiment transmits the mails to the other addresses per predetermined number of mails in Step S200. When a number of other addresses is 10,000 for example, the transmitting section 30 transmits the mails to the other addresses per 200 mails.

When the receiving section 60 receives the fail message in Step 205, i.e., YES, after transmitting the predetermined number of mails, the reply time recording section 50 records the time when the receiving section 60 has received the fail message. Here, the reply time recording section 50 calculates a period of time from the time when the mail has been transmitted and previously recorded to the time when the receiving section 60 has received the fail message and records it as a reply time in Step S210.

The fail rate measuring section 40 measures a fail rate by dividing the number of fail messages received by the receiving section 60 by the number of mails transmitted by the transmitting section 30 in Step S215. Here, the fail rate measuring section 40 stores the measured fail rate therein. Still more, the transmitting section 30 calculates an average reply time which is an average value of reply times recorded by the reply time recording section 50 and determines a transmitting period so that the number of fail messages notified within the average reply time becomes equal to or less than a value set in advance in Step S220. Here, the transmitting section 30 of the present embodiment calculates the mail transmitting period by multiplying the value obtained by dividing the average reply time by the predetermined number of fail messages notified within the average reply time with the fail rate.

When an initial value of the fail rate is set at "0.05", the transmitting period is determined so as to receive the fail message at rate of one mail or less to the average reply time and the average reply time of 200 transmitted mails is two seconds for example, the transmitting section 30 determines the mail transmitting period as "0.1 second" from the calculation of:

2 seconds (average reply time)÷1 mail (number of fail messages notified within the average reply time and set in advance)×0.05 (fail rate).

When the fail rate measured by the fail rate measuring section 40 is higher than the value set in advance, i.e., YES in Step S225, the transmitting section 30 lowers the mail transmitting period in Step S230. Because the transmitting section 30 of the present embodiment calculates the mail transmitting period by multiplying the value obtained by dividing the average reply time by the number of fail messages notified within the average reply time with the fail rate, the higher the value of the fail rate, the lower the mail transmitting period becomes. When 100 fail messages are returned out of 200 transmitted mails for example, the fail rate is "0.5" from the calculation of 100 (fail massages)÷200(mails), which is higher than the initial value of the fail rate of 0.05. In this case, the transmitting section 30 determines the mail transmitting period at 1 second from the calculation of:

2 seconds (average reply time)+1 mail (number of fail messages notified within the average reply time and set in advance)×0.5 (fail rate).

Still more, the transmitting section 30 informs the user of the time when the distribution of the mail ends in Step S235. Here, the transmitting section 30 finds the time when the distribution of the mail ends by calculating the time required for the distribution of the mails by dividing the number of mails to be transmitted by the mail transmitting periods and by adding it to the time when the distribution of the mail has been started.

When the fail rate is lower than the value set in advance, i.e., NO in Step S225, the process in the flowchart advances to Step S235 without carrying out the operation of Step S230. When the mails have not transmitted to all the other addresses, i.e., NO in Step S240, the process in the flowchart returns to Step S200 to carry out the operations from Step S200 to Step S235. In transmitting 10,000 mails per 200 mails, the mail distributing apparatus 100 repeats the operations from Step S200 to Step S235 by 50 times. When a fail rate measured in the next Step S215 is higher than the fail rate measured in the previous Step S215 in repeating those operations, i.e., YES in Step S225, the transmitting section 30 lowers the mail transmitting period in Step 230.

Then, when the transmission of all the mails ends, i.e., YES in Step S240, the transmission recording section 10 records the date and time stored in correlation with each mailing address from which no fail message has been received as the date and time when the mail has been successfully transmitted in Step S245. The process of the flowchart thus ends.

It is noted that although the transmitting section 30 of the present embodiment lowers the mail transmitting period when the receiving section 60 has received the fail messages at rate higher than the fail rate measured by the fail rate measuring section 40, it may be arranged more simply so as to lower the mail transmitting period upon receiving the fail messages. In this case, the transmitting section 30 lowers the mail transmitting period only by rate set in advance from the mail transmitting period set till then. For instance, the transmitting section 30 lowers the mail transmitting period by lowering the mail transmitting period to a half of the mail transmitting period till then. It permits to prevent the congestion from occurring in the mail distributing apparatus 100.

Although the invention has been described by way of an exemplary embodiment, it should be understood that those skilled in the art might make many changes and substitutions without departing from the spirit and the scope of the invention. It is obvious from the definition of the appended claims that the embodiments with such modifications also belong to the scope of the invention.

What is claimed is:

1. A computer program product having computer instructions, recorded on a computer readable storage medium, for enabling a computer executing the computer instructions to perform mail distributing operations comprising:

recording a date and time when a plurality of mails have been successfully transmitted previously per mailing address;

selecting a first group of the mailing addresses to which the mails have been successfully transmitted previously on the date and time within a predetermined selecting period by making reference to said recording when a mail distributing apparatus is commanded to distribute mails to a plurality of addresses;

transmitting mails to the first group of the mailing addresses selected by said selecting at first, and after that, transmitting mails to a second group of the addresses not selected by said selecting;

recording reply times taken to receive fail messages for the each of the mails that have not been successfully transmitted to the first and second group of mailing addresses;

measuring a fail rate which is a ratio of the number of received fail messages to the number of mails transmitted to the second group of addresses; and determining an average reply time based on said recorded reply times for the addresses in the second group of addresses, wherein said transmitting further comprises re-transmitting mails to the second group of addresses at periods determined by multiplying the fail rate by a value which is the average reply time divided by a predetermined acceptable number of fail messages to be received within the average reply time for the second group of mailing addresses.

2. The computer program product as set forth in claim 1, wherein said transmitting transmits a predetermined number of the mails to the second group of addresses per mail transmitting period, the mail transmitting period being longer than that at which the mails are transmitted to the first group of addresses.

3. The computer program product as set forth in claim 2, wherein said transmitting determines the number of mails for transmitting per mail transmitting period within a time that is determined such that the number of mails transmitted per average reply time is equal to or less than a number set in advance.

4. The computer program product as set forth in claim 1, wherein said transmitting increases the mail transmitting period when the fail messages are received at a fail rate greater than the fail rate previously measured by said measuring.

5. The computer program product as set forth in claim 1, wherein said transmitting determines the time when the distribution of the mail ends based on the fail rate and the computer informs a user of the time.

6. The computer program product as set forth in claim 1, wherein said transmitting increases the mail transmitting period upon receiving the fail messages indicating that the email has not been transmitted to the address.

7. A computer readable medium storing thereon a program for enabling a computer to operate as a mail distributing apparatus comprising:

transmission recording means for recording a date and time when a plurality of mails have been successfully transmitted previously per mailing address;

address selecting means for selecting a first group of the mailing addresses to which the mails have been successfully transmitted previously on the date and time within a predetermined selecting period by making reference to said recording when a mail distributing apparatus is commanded to distribute mails to a plurality of addresses;

transmitting means for transmitting mails to the first group of the mailing addresses selected by said selecting at first, and after that, transmitting mails to a second group of the addresses not selected by said selecting;

a reply time recording reply times taken to receive fail messages for the each of the mails that have not been successfully transmitted to the first and second group of mailing addresses;

a fail rate measuring means measuring a fail rate which is a ratio of the number of received fail messages to the number of mails transmitted to the second group of addresses; and determining means for determining an average reply time based on said recorded reply times for the addresses in the second group of addresses, wherein said transmitting means further comprises re-transmitting mails to the second group of addresses at periods determined by multiplying the fail rate by a value which is the average reply time divided by a predetermined acceptable number of fail messages to be received within the average reply time for the second group of mailing addresses.

8. The computer readable medium as set forth in claim 7, wherein said transmitting means transmits a predetermined number of mails to the second group of addresses per mail transmitting period, the mail transmitting period being longer than that at which the mails are transmitted to the first group of addresses.

9. The computer readable medium as set forth in claim 8, wherein said transmitting means determines the number of mails for transmitting per mail transmitting period within a time that is determined in accordance with the such that the number of mails transmitted per average reply is equal to or less than a number set in advance.

10. The computer readable medium as set forth in claim 7, wherein said transmitting means increases the mail transmitting period when the fail messages are received at a fail rate greater than the fail rate previously measured by said fail rate measuring means.

11. The computer readable medium as set forth in claim 7, wherein said transmitting means determines the time when the distribution of mails ends based on the fail rate and the mail distributing apparatus informs a user of the time.

12. A mail transmission method, implemented in a computer, comprising:
- recording a date and time when a plurality of mails have been successfully transmitted previously per mailing address;
- selecting a first group of the mailing addresses to which the mails have been successfully transmitted previously on the date and time within a predetermined selecting period by making reference to said recording when a mail distributing apparatus is commanded to distribute mails to a plurality of addresses;
- transmitting mails to the first group of the mailing addresses selected by said selecting at first, and after that, transmitting mails to a second group of the addresses not selected by said selecting;
- recording reply times taken to receive fail messages for the each of the mails that have not been successfully transmitted to the first and second group of mailing addresses;
- measuring a fail rate which is a ratio of the number of received fail messages to the number of mails transmitted to the second group of addresses; and
- determining an average reply time based on said recorded reply times for the addresses in the second group of addresses,
- wherein said transmitting further comprises re-transmitting mails to the second group of addresses at periods determined by multiplying the fail rate by a value which is the average reply time divided by a predetermined acceptable number of fail messages to be received within the average reply time for the second group of mailing addresses.

13. The mail transmission method as set forth in claim 12, wherein said transmitting step transmits a predetermined number of the mails to the second group of addresses per mail transmitting period, the mail transmitting period being longer than that at which the mails are transmitted to the first group of addresses.

14. The mail transmission method as set forth in claim 13, wherein said transmitting step determines the number of mails for transmitting per mail transmitting period within a time that is determined such that the number of mails transmitted per average reply time is equal to or less than a number set in advance.

15. The mail transmission method as set forth in claim 12, wherein said transmitting increases the mail transmitting period when the fail messages are received at a fail rate greater than the fail rate previously measured by said measuring step.

16. The mail transmission method as set forth in claim 12, wherein the time when the distribution of mails ends is determined by said transmitting based on the fail rate and the mail distributing apparatus informs a user of the time.

* * * * *

UNITED STATES PATENT AND TRADEMARK OFFICE
CERTIFICATE OF CORRECTION

PATENT NO. : 7,660,858 B2  
APPLICATION NO. : 11/140409  
DATED : February 9, 2010  
INVENTOR(S) : Yuichiro Tsutsui It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Thirtieth Day of November, 2010

David J. Kappos  
*Director of the United States Patent and Trademark Office*